(12) United States Patent
Tanzi et al.

(10) Patent No.: US 10,686,546 B2
(45) Date of Patent: *Jun. 16, 2020

(54) PATH SELECTION IN OPTICAL NETWORK FOR OPTICAL NODES WITH FLEXIBLE BAUD RATE AND MODULATION FORMAT

(71) Applicant: Cisco Technology, Inc., San Jose, CA (US)

(72) Inventors: Alberto Arnaldo Tanzi, Trezzano sul naviglio (IT); Stefano Piciaccia, Milan (IT); Maurizio Gazzola, Milan (IT); Lorenzo Ghioni, Casalmaiocco (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/449,618

(22) Filed: Jun. 24, 2019

(65) Prior Publication Data
US 2019/0379480 A1 Dec. 12, 2019

Related U.S. Application Data

(63) Continuation of application No. 16/003,352, filed on Jun. 8, 2018.

(51) Int. Cl.
*H04J 14/00* (2006.01)
*H04J 14/02* (2006.01)
(Continued)

(52) U.S. Cl.
CPC .... *H04J 14/0271* (2013.01); *H04B 10/07953* (2013.01); *H04J 14/0267* (2013.01);
(Continued)

(58) Field of Classification Search
CPC .... H04J 14/02; H04J 14/0256; H04J 14/0268; H04J 14/0269; H04J 14/0258;
(Continued)

(56) References Cited

U.S. PATENT DOCUMENTS 8,639,118 B2   1/2014   Wu et al.
8,903,240 B2   12/2014   Ghioni et al.
(Continued)

FOREIGN PATENT DOCUMENTS

WO   2013026498 A1   2/2013

OTHER PUBLICATIONS

International Search Report and Written Opinion in counterpart European Application No. 19179203.5, dated Sep. 26, 2019, 10 pages.

*Primary Examiner* — Hanh Phan
(74) *Attorney, Agent, or Firm* — Edell, Shapiro & Finnan, LLC

(57) ABSTRACT

A network controller controls optical nodes configured to communicate with each other at multiple line rates using different tuples of [bits/symbol, symbol rate] for each line rate. The network controller determines multiple paths between two optical nodes, selects a desired line rate at which to communicate between the two optical nodes, and accesses a path database that indicates an available optical bandwidth and an available optical signal-to-noise ratio (SNR) along each path. The network controller determines feasible paths among the paths. To do this, the network controller, for each path, searches the different tuples of the desired line rate for a tuple for which a desired optical bandwidth and a desired optical SNR are accommodated by the available optical bandwidth and the available optical SNR of the path, respectively. The network controller programs optical nodes of one of the feasible paths with a tuple found in the searching.

20 Claims, 7 Drawing Sheets

(51) Int. Cl.
*H04B 10/079* (2013.01)
*H04Q 11/00* (2006.01)

(52) U.S. Cl.
CPC . *H04Q 11/0062* (2013.01); *H04Q 2011/0079* (2013.01); *H04Q 2011/0088* (2013.01)

(58) Field of Classification Search
CPC .......... H04Q 11/0062; H04Q 11/0066; H04Q 11/0067; H04Q 11/0003; H04Q 11/0005; H04B 10/0795; H04L 45/62
USPC ........ 398/45, 48, 49, 33, 38, 79, 83, 25, 26, 398/27, 2, 3, 4, 5, 56, 57, 58, 59; 370/352, 392, 389, 468, 225, 228, 254, 370/216, 235, 230, 252
See application file for complete search history.

(56) References Cited

U.S. PATENT DOCUMENTS

| | | | |
|---|---|---|---|
| 8,964,581 | B2 | 2/2015 | Takara et al. |
| 9,485,553 | B2 * | 11/2016 | Magri .................... H04Q 45/62 |
| 10,374,745 | B1 * | 8/2019 | Tanzi ............... H04B 10/07953 |
| 2009/0034978 | A1 | 2/2009 | Gazzola et al. |
| 2009/0180785 | A1 | 7/2009 | Tajima |
| 2010/0202773 | A1 | 8/2010 | Lee et al. |
| 2011/0013908 | A1 * | 1/2011 | Gazzola .................. H04L 41/12 398/48 |
| 2014/0226985 | A1 | 8/2014 | Patel et al. |
| 2017/0134089 | A1 | 5/2017 | Mansouri et al. |

* cited by examiner

| PATH | OPTICAL BAND WIDTH | OPTICAL SNR (REF. BR) | PATH METRIC |
|---|---|---|---|
| PATH1 | OBW_P1 | OSNRref_P1 | PM1 |
| PATH2 | OBW_P2 | OSNRref_P2 | PM2 |
| PATH3 | OBW_P3 | OSNRref_P3 | PM3 |
| PATH4 | OBW_P4 | OSNRref_P4 | PM4 |

FIG. 6

PATH SELECTION IN OPTICAL NETWORK FOR OPTICAL NODES WITH FLEXIBLE BAUD RATE AND MODULATION FORMAT

CROSS-REFERENCE TO RELATED APPLICATION

This application is a continuation application of U.S. application Ser. No. 16/003,352, filed on Jun. 8, 2018, the entirety of which is incorporated herein by reference.

TECHNICAL FIELD

The present disclosure relates to path selection in optical networks.

BACKGROUND

Optical nodes in an optical network may employ optical interfaces offering high flexibility in terms of modulation format and symbol rate. Different combinations of modulation format and symbol rate use correspondingly different optical bandwidth and optical signal-to-noise ratios for error free transmission along network paths of the optical network. A control plane of the optical network typically has access to various transmission-related metrics associated with the network paths.

BRIEF DESCRIPTION OF THE DRAWINGS

FIG. 6 is an illustration of a path database stored in the optical network, according to an example embodiment.

DESCRIPTION OF EXAMPLE EMBODIMENTS

Overview

A network controller controls a network of optical nodes configured to communicate with each other at multiple line rates using different tuples of [bits/symbol, symbol rate] for each line rate. The network controller determines multiple paths between two optical nodes, selects a desired line rate at which to communicate between the two optical nodes, and accesses a path database that indicates an available optical bandwidth and an available optical signal-to-noise ratio (SNR) along each path. The network controller determines feasible paths among the multiple paths. To do this, the network controller, for each path, searches the different tuples of the desired line rate for a tuple for which a desired optical bandwidth and a desired optical SNR are accommodated by the available optical bandwidth and the available optical SNR of the path, respectively. The network controller programs optical nodes of one of the feasible paths with a tuple found in the searching.

Example Embodiments

Embodiment presented herein combine control plane knowledge in an optical network with programmable flexibility of optical interfaces of optical nodes in the optical network with respect to modulation format and symbol rate to optimize optical traffic transported in the optical network under different conditions.

Figure 1:
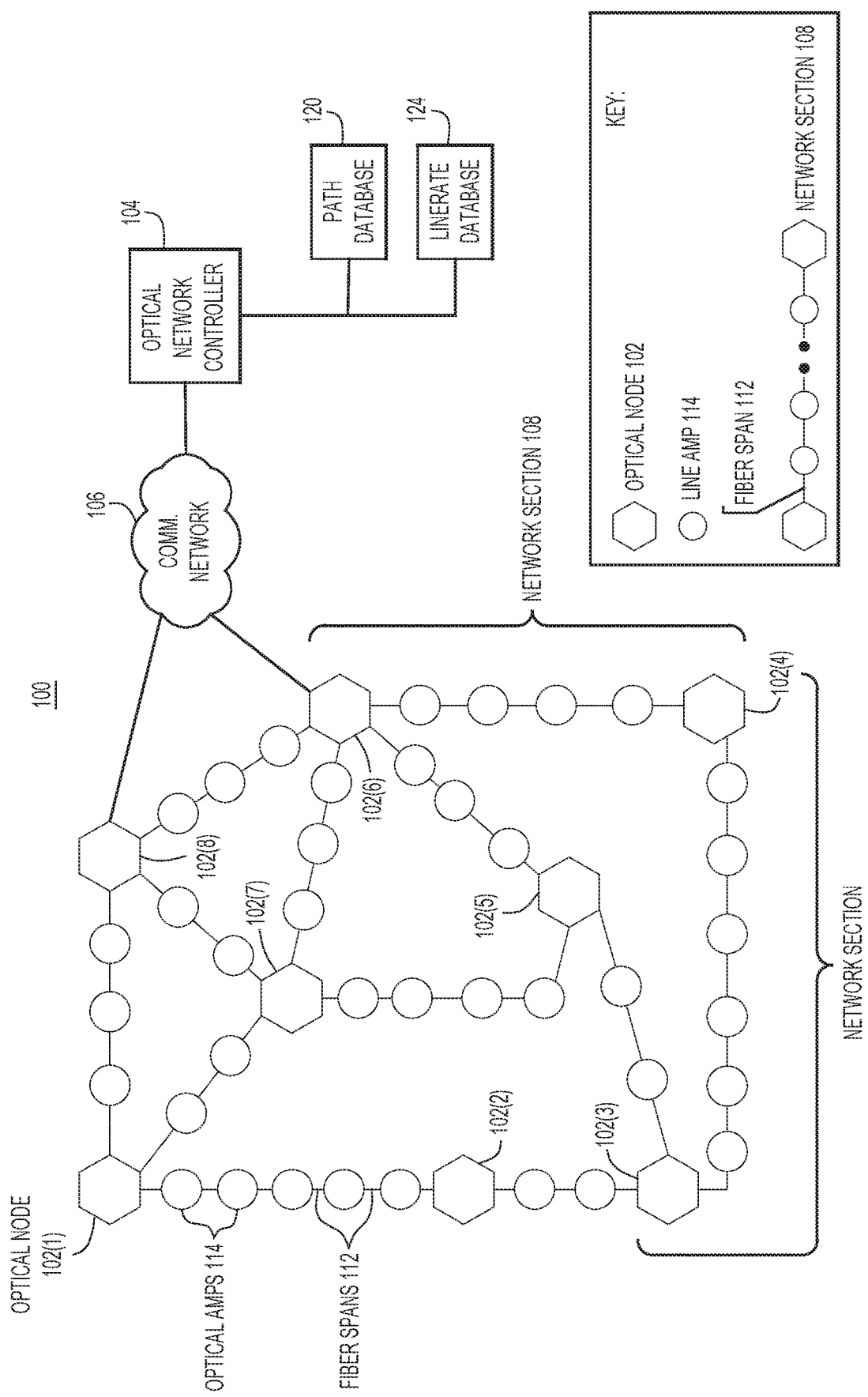
FIG. 1 is a block diagram of an optical network in which embodiments directed to combining optical node interface flexibility with control plane knowledge in order to optimize optical transmission in the optical network may be implemented, according to example embodiment.

As mentioned above, a control plane of the optical network typically has access to various transmission-related metrics associated with the network paths. However, conventionally, the control plane fails to combine the flexibility of the optical interfaces and their optical conditions with the knowledge of the control plane in order to establish optimum optical transmission. With reference to FIG. 1, there is a block diagram of an example optical network 100 in which the embodiments directed to combining optical interface flexibility with control plane knowledge to optimize optical transmission in the optical network may be implemented. Optical network 100 includes a network of optical devices or nodes 102(1)-102(8) (collectively and individually referred to as "optical nodes 102" and an "optical node 102," respectively) and an optical network controller 104 (also referred to more simply as a "network controller 104") configured to communicate with each optical node over a communication network 106. Optical nodes 102 transmit optical signals to and receive optical signals from each other in an optical data/forwarding plane of the optical network that carries user traffic. Network controller 104 communicates with and controls optical nodes 102 in a control plane of optical network 100. For example, via the control plane, network controller 104 provisions and controls the optical nodes for operation in the data plane.

In an example, optical network 100 may include a spectrum switched optical network (SSON) in which optical nodes 102 each transmit and receive wavelength-division multiplexing (WDM) optical signals, and the optical nodes may each include a reconfigurable optical add-drop multiplexer (ROADM) configured to remotely switch the WDM optical signals. From a topology point of view, optical network 100 includes network segments or sections 108 that connect optical node 102 to adjacent optical nodes, as shown. Network sections 108 each include a series of alternating optical fiber spans 112 and optical fiber amplifiers 114. Optical fiber spans 112 carry optical signals over distances while optical fiber amplifiers 114 amplify the optical signals traversing the optical fiber spans. Optical nodes 102 communicate with each other over optical network paths each comprising one or more of series connected network sections 108, as will be described more fully below.

Optical network 100 also includes multiple control plane databases used by the optical network to provision and control the optical network, and to perform embodiments presented herein. The control plane databases include a path database 120 and a line rate database 124 each accessible to network controller 104 and each of optical nodes 102 via the control plane, for example. Databases 120 and 124 may be centralized and stored in a single location in optical network 100, such as with network controller 104, or a cloud-based datacenter. Alternatively, databases 120 and 124 may be distributed among optical nodes 102 and network controller 104. Path database 120 stores respective path metrics for each of various network paths between optical nodes 102, including available optical bandwidth (BW) (OBW) for each network path, an available optical signal-to-noise ratio (SNR) (OSNR) for each network path, network path latency, network path length, and the like. Line rate database 124 stores available traffic line rates and, for each line rate, parameters associated with implementing that line rate, such as bits/symbol, symbol rate (which relates directly to a desired OBW), and a desired OSNR, as will be described below.

Figure 2:
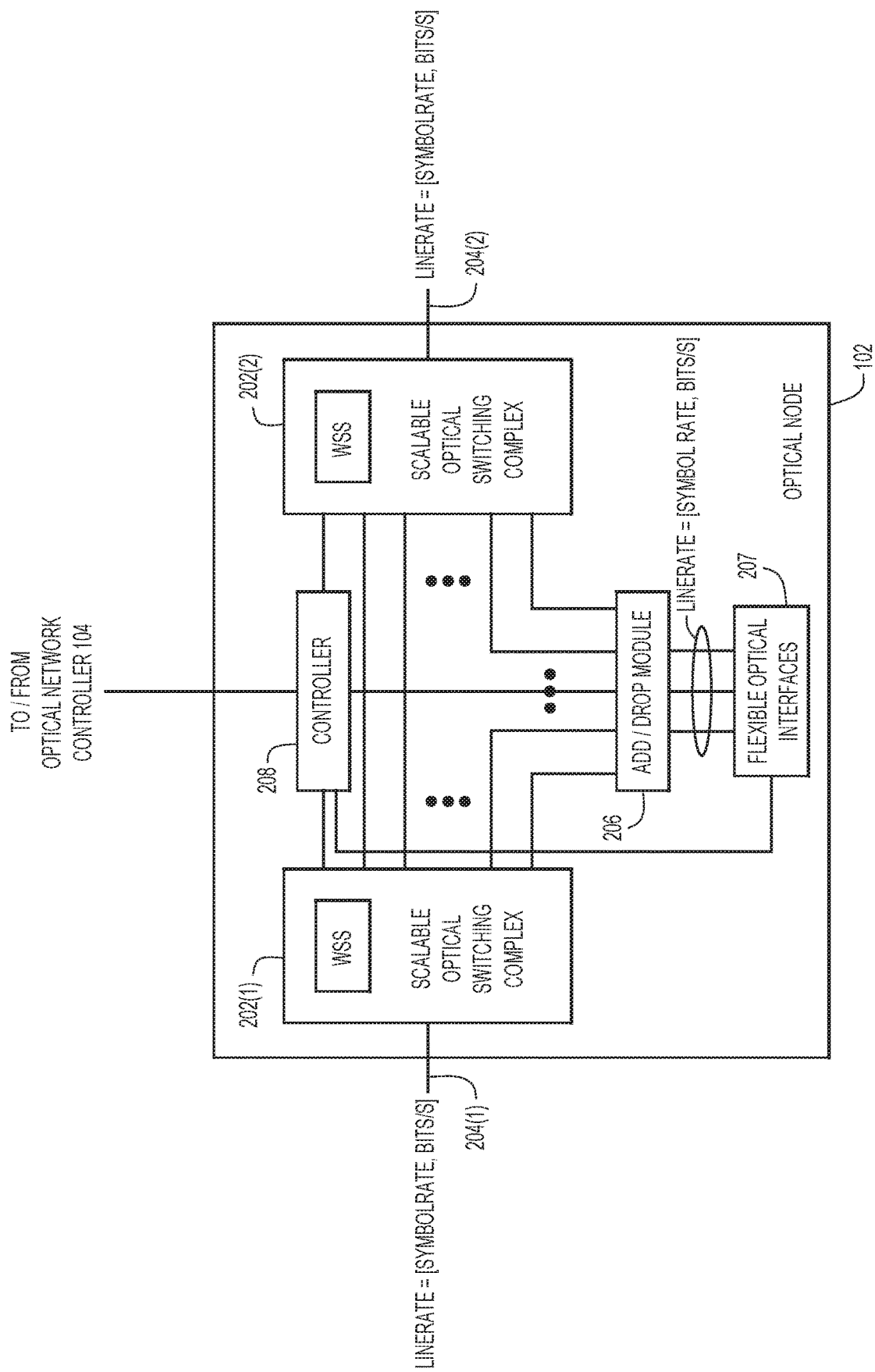
FIG. 2 is a high-level block diagram of a representative optical node of the optical network, according to an example embodiment.

With reference to FIG. 2, there is a high-level block diagram representative of each of optical nodes 102 configured as a ROADM node, according to an embodiment. In the example of FIG. 2, optical node 102 includes programmable switching complexes 202(1) and 202(2) that have optical interfaces of the optical node coupled to optical fibers 204(1) and 204(2), respectively, an add/drop module 206, flexible optical interfaces 207 that control parameters of the optical interfaces, and an optical node controller 208 (also referred to more simply as a "node controller 208") coupled to the switching complexes, the add drop module, the flexible optical interfaces, and to optical network controller 104 over a control plane link, e.g., implemented over communication network 106. Optical fibers 204(1) and 204(2) may each carry, toward or away from optical node 102, a wave division multiplexed (WDM) or dense (DWDM) optical signal comprising multiple channels (i.e., wavelengths). Switching complexes 202(1) and 202(2) include respective wavelength selectable switches (WSSs) to configure the channels in the optical signal transiting optical node 102 under control of node controller 208. Add/drop module 206 may add or drop particular channels to or from the multiplexed optical signal. A typical channel may have an OBW in a range of 28 GHz to 100 GHz, for example, although other channel OBWs are possible.

Node controller 208 controls the optical interfaces to optical fibers 204(1) and 204(2) through flexible optical interfaces 207, generally, and also responsive to control plane commands received from network controller 104 over the control plane. Flexible optical interfaces 207 (and thus the optical interfaces) are highly flexible in terms of optical modulation format and optical symbol rate. That is, node controller 208 may program components of flexible optical interfaces 207, switching complexes 202, and add/drop module 206 so as to transmit/receive optical signals (also referred to as "optical traffic") to/from optical fibers 204(1) and 204(2) with a wide variety of optical modulation formats and over a wide range of symbol rates. In particular, the flexibility of flexible optical interfaces 207 leads to many different possible combinations of symbol rate (i.e., baud rate) and number of bits-per-symbol (referred to as "bits/symbol" or more simply as "bits/s") for optical traffic operating at a given optical throughput or "line rate." The line rate, in bits/second, is defined as a function of symbol rate and bits/symbol. The function may be a product of the two parameters, and/or may relate to Forward Error Correction (FEC) overhead, a type of encoding, and so on. The different combinations of symbol rate and bits/symbol may be represented correspondingly as different [bit/symbol, symbol rate] tuples (also referred to as "tuples of [bit/symbol, symbol rate]"). For error free transmission, each [bit/symbol, symbol rate] tuple determines or corresponds to a set of conditions in terms of a desired OSNR (also referred to simply as an "OSNR") and a desired OBW (also referred to simply as an "OBW") used by an optical channel that carries the optical traffic for error free transmission. The desired OBW is proportional to the symbol rate and is thus easily derived from the symbol rate, and vice versa. In one example, the desired OBW and the symbol rate are equivalent, i.e., symbol rate=desired OBW. In the ensuing description and in the figures, the term "line rate" may be replaced with either of the synonymous terms "linerate," "LineRate," or derivatives thereof.

Thus, for a given line rate, an increase in bit/symbol results in a corresponding decrease in symbol rate, hence a decrease in desired OBW for the channel carrying the optical traffic; while, at the same time, the desired OSNR for error free transmission increases. Therefore, for optimum (or near optimum) optical network performance for optical traffic at a given line rate, a tradeoff between symbol rate and bit/symbol is found, i.e., an optimal (or near optimal) [bit/symbol, symbol rate] tuple—which translates to a desired OBW and a desired OSNR—with respect to the available OBW and the available OSNR on a network path carrying the optical traffic, i.e., to ensure the network path has sufficient available OBW and available OSNR to accommodate the desired OBW and the desired OSNR associated with the [bit/symbol, symbol rate] tuple for a line rate if a channel operating at the line rate were added to the network path.

At any given time, a request to route traffic between a source optical node and a destination optical node among optical nodes 102 may be satisfied by several possible network paths between the nodes in optical network 100. Each network path typically offers a respective combination of a minimum available OSNR and a maximum available OBW that is different from that of the other network paths. For a given network path, available OBW depends on the optical traffic already routed along the network path, which is dynamic, and also a total number and type of optical filters present in optical nodes 102 along the network path; this is quasi-static. Thus, the available OBW for the network path may be computed starting from a theoretical available OBW from the source node to the destination node based on available frequency slots (i.e., frequency slots not being used on the network path for other optical traffic). Then, the theoretical available OBW is reduced by optical band-narrowing caused by the total number and the types of optical nodes (and optical filters) along the network path. The final available OBW represents the OBW imposed by the component among all of the components in the network path having the narrowest OBW. Thus, once the OBWs of the all of the components are known, the available OBW may be determined, e.g., by inspection.

The available OSNR along the network path represents quasi-static information because it depends on a physical topology (e.g., types of optical fibers used in each network section 108, optical signal losses along fiber spans 112, types of optical amplifiers at each amplifier site 114 and in each optical node 102, and optical amplifier working points (e.g., gain and optical power output) and non-linear noise caused by optical propagation along fiber spans 112 of the network path. Additional impairments, such as linear crosstalk from other optical channels traversing the network path, due to optical hardware limitations and imperfections, contributes to further OSNR degradation. Such impairments may be considered dynamic because they depend on a traffic matrix that represents the optical traffic traversing the network paths present in optical network 100 at the time the impairments are measured.

Thus, the available OSNR for the network path may be computed based on factors including, but not limited to, a signal spectral density (e.g., optical channel spacing) defined over each network section (e.g., network sections 108) of the network path, and an actual contribution of linear noise and non-linear noise resulting from propagation of the optical traffic along the network path. Linear noise may arise from amplified spontaneous emission (ASE) and sources of optical cross-talk along network sections 108. In general total OSNR (calculated in Linear units) may be calculated as:

$$\frac{1}{OSNR_{tot}} = \frac{1}{OSNR\_lin} + \frac{1}{OSNR\_nl},$$

where:
OSNR_lin is the OSNR contribution due to the linear noise amplifiers and the optical crosstalk;
OSNR_nl is the OSNR contribution due to the non-linear noise.

The available OSNR may be computed with respect to a reference symbol rate, i.e., as a reference available OSNR that is normalized/referenced to the reference symbol rate. The reference available OSNR may be scaled or translated to an actual available OSNR for a given symbol rate based on the reference available OSNR, the reference symbol rate, and the given symbol rate. The different OSNR contributions may be scaled with a factor F:

$$F = \left(\frac{\text{Actual Symbol Rate}}{\text{Reference Symbol Rate}}\right)^n,$$

where n depends on the type of OSNR contribution.

Optical network 102, e.g., network controller 104, relies on control plane algorithms and databases to perform circuit validation before provisioning optical nodes 102 for operation in the data plane. In particular, optical network 100 may use the SSON control plane to perform channel routing and validation, and also to manage in a flexible way the manner in which the available OBW and available OSNR may be used for a channel. The SSON control plane is frequently updated with network path/optical channel information, and thus has up-to-date knowledge of the optical traffic in the data plane, the available OBW on each network path and the available OSNR on each network path based on propagation effects. The SSON control plane stores the knowledge/information in path database 120.

Accordingly, embodiments presented herein combine the abovementioned network knowledge of the control plane, including available OBW and available OSNR for different network paths of optical network 100 from a source optical node to a destination optical node, with the flexibility of different line rates and different possible [bits/symbol, symbol rate] tuples available to achieve the line rates as employed by optical nodes 102, in order to determine/select an optimal (or near optimal) network path over which to transport optical traffic.

Figure 3:
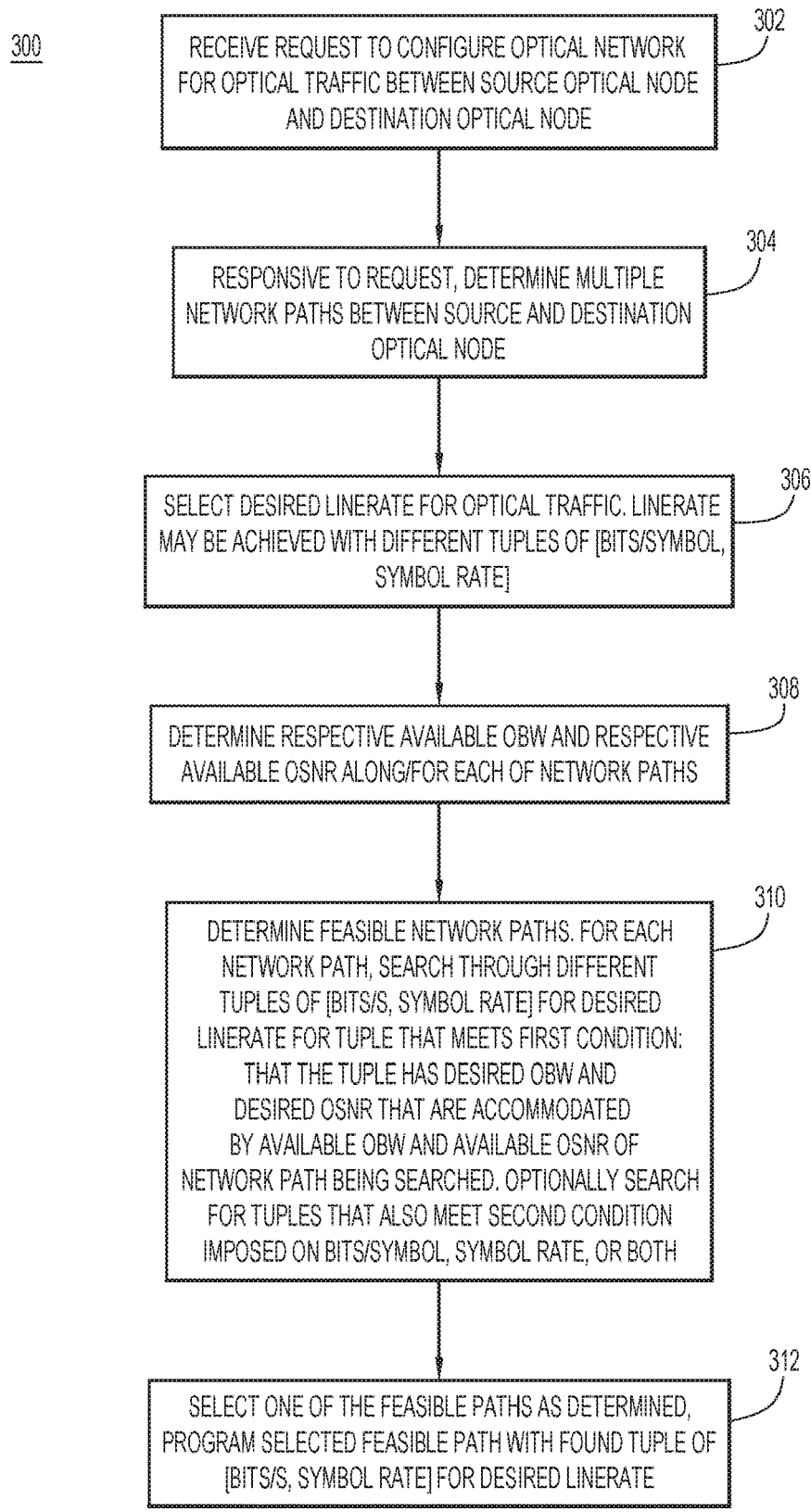
FIG. 3 is a flowchart of a generalized method of combining optical node interface flexibility with control plane knowledge in order to optimize optical transmission in the optical network, according to an example embodiment.

With reference to FIG. 3, there is a flowchart of a generalized example method 300 of determining an optimal (or near optimal) network path between a source optical node and a destination optical node among optical nodes 102 based on available OBW, available OSNR, line rates, and tuples of [bits/symbol, symbol rate], which translate to desired OBW and desired OSNR associated with the tuple. An example implementation of method 300 will be described in connection with FIGS. 4-6 after method 300 is described.

Method 300 may be performed primarily in the control plane of optical network 100 by network controller 104. Alternatively, method 300 may be performed in a distributed fashion across the control plane and across network controller 104 and node controllers 208. Method 300 assumes that optical nodes 102 have flexible, programmable optical interfaces/flexible optical interfaces that enable the optical nodes to communicate with each other in the optical data plane at multiple line rates using different tuples of [bits/symbol, symbol rate] for each line rate.

At 302, network controller 104 receives a request to configure optical network 100 for optical traffic (in the data plane) between a source optical node and a destination optical node among optical nodes 102.

At 304, responsive to the request, network controller 104 determines multiple network paths between the source optical node and the destination optical node for the optical traffic. Network controller 104 may use any know or hereafter developed technique of finding network paths between the source optical node and the destination optical node in optical network 100.

At 306, network controller 104 selects a desired line rate for the optical traffic from among a set of predetermined line rates that optical nodes 102 may accommodate. That is, network controller 104 selects the desired line rate at which to communicate between the source optical node and the destination optical node. Each line rate may be achieved with different tuples of [bits/s, symbol rate]. Network controller 104 may select the line rate from path database 120 including known line rates and, for each line rate, different known tuples of [bits/symbol, symbol rate] that achieve the line rate.

At 308, network controller 104 determines a respective available OBW and a respective available OSNR along/for each of the network paths determined at operation 304. Any known or hereafter developed techniques for determining the available OBW and the available OSNR may be used. Alternatively, the available OBW and the available OSNR may be predetermined. For example, network controller 104 may access the available OBW and the available OSNR for each path from path database 120 that stores for each network path the available OBW and the available OSNR.

At 310, network controller 104 determines "feasible" network paths (referred to in the ensuing description simply as "feasible paths") among the network paths determined at operation 304. To do this, network controller 104, for each network path, searches the different tuples of [bits/s, symbol rate] that can achieve the desired Line rate for a tuple that meets a first condition that the tuple has a desired OBW and a desired OSNR that are accommodated by (i.e., less than or equal to) the available OBW and the available OSNR of the network path, respectively. The desired OBW and the desired OSNR for each tuple may be computed using any known or hereafter developed technique, or the desired OBW and the desired OSNR may be predetermined.

Optionally, operation 304 may search the different tuples for a tuple that meets both the first condition and a second condition (i.e., one or more criteria) imposed on the bits/symbol, the symbol rate, or both the bits/symbol and the symbol rate.

Non-limiting examples of searches performed under the second condition include:

a. A search for a tuple that has a lowest bits/symbol and corresponding lowest desired OSNR among the different tuples and that has a desired OBW that is able to be allocated in a continuous spectrum of the available optical bandwidth of the path currently being searched. One example of such as search is described below as Algorithm 1.

b. A search for a tuple that has a highest bits/symbol and correspondingly lowest desired OBW among the different tuples and that has a desired OBW that is able to be allocated in a continuous spectrum of the available optical bandwidth of the currently path being searched. One example of such as search is described below as Algorithm 2.

If only the first condition is used, the one or more network paths that meet/pass the first condition are the feasible paths. If a second condition is used, the one or more network paths that meet/pass both the first condition and second condition are the feasible paths.

Operation 310 may result in determining one or more feasible paths.

At 312, network controller 104 selects one of the one or more feasible paths (referred to above as the "optimal (or near optimal)" network path), and programs the optical nodes (among optical nodes 102) of the selected feasible path with a tuple of [bits/symbol, symbol rate] found in search 310 for the selected feasible path. For example, network controller 104 may send to node controller 208 in the control plane a command including the bits/symbol and symbol rate of the found tuple and, upon receipt of the command, the node controller programs the optical interfaces of the selected optical node with the tuple parameters. Specifically, the flexible optical interfaces at source and destination optical nodes are programmed with the tuple [bit/symbol, symbol rate], and WSS modules of optical nodes along the optical path (including in the source, destination, and intermediate optical nodes) are programmed to carry the OBW (including a flexible optical spectrum slice and optical amplifiers power settings).

In one example, operation 312 may simply select a first (i.e., initial) feasible path that is found in the search. Operation 310 may find multiple feasible paths, in which case operation 312 may select one of the feasible paths using any number of techniques. For example, operation 312 may randomly select one of the feasible paths. Alternatively, operation 312 may select the feasible path based on a selection criteria imposed on various path metrics that are either known or computed for the feasible paths, as follows:

a. Network controller 104 computes for each feasible path an OSNR margin as a difference between the available OSNR for the feasible path and the desired OSNR for the tuple found for the feasible path. Then, network controller 104 selects the feasible path having a largest OSNR.

b. Network controller 104 accesses time delay/latency or path length for each feasible path from path database 120, and then selects the feasible path having the shortest time delay/latency or shortest path, respectively. Latency may be determined using any known or hereafter developed technique.

Method 300 is now described with reference to an example implementation of the method with reference to FIGS. 4-6.

At operations 302 and 304, network controller 104 selects optical node 102(1) ("optical node A") as the source node and optical node 102(3) ("optical node Z") as the destination optical node, and identifies multiple network paths paths1-paths4 between the two nodes.

Figure 4:
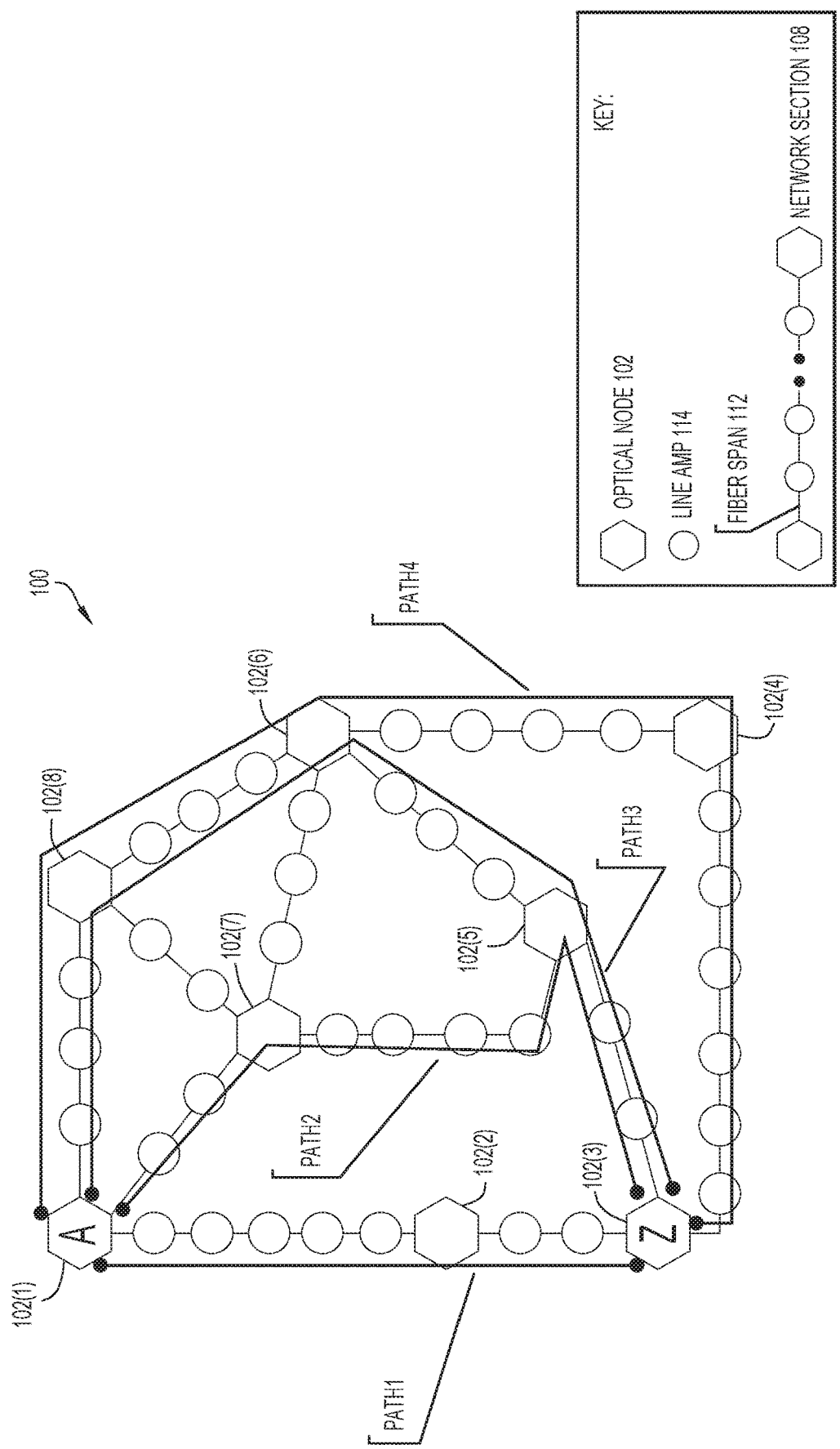
FIG. 4 is a block diagram of the optical network that shows multiple network paths between source and destination optical nodes, according to an example embodiment.

With reference to FIG. 4, there is a block diagram of optical network 100 that shows multiple network paths path1-path4 between optical node A and optical node Z as determined at operation 304.

At operation 306, controller selects a desired line rate from line rate database 124.

Figure 5:
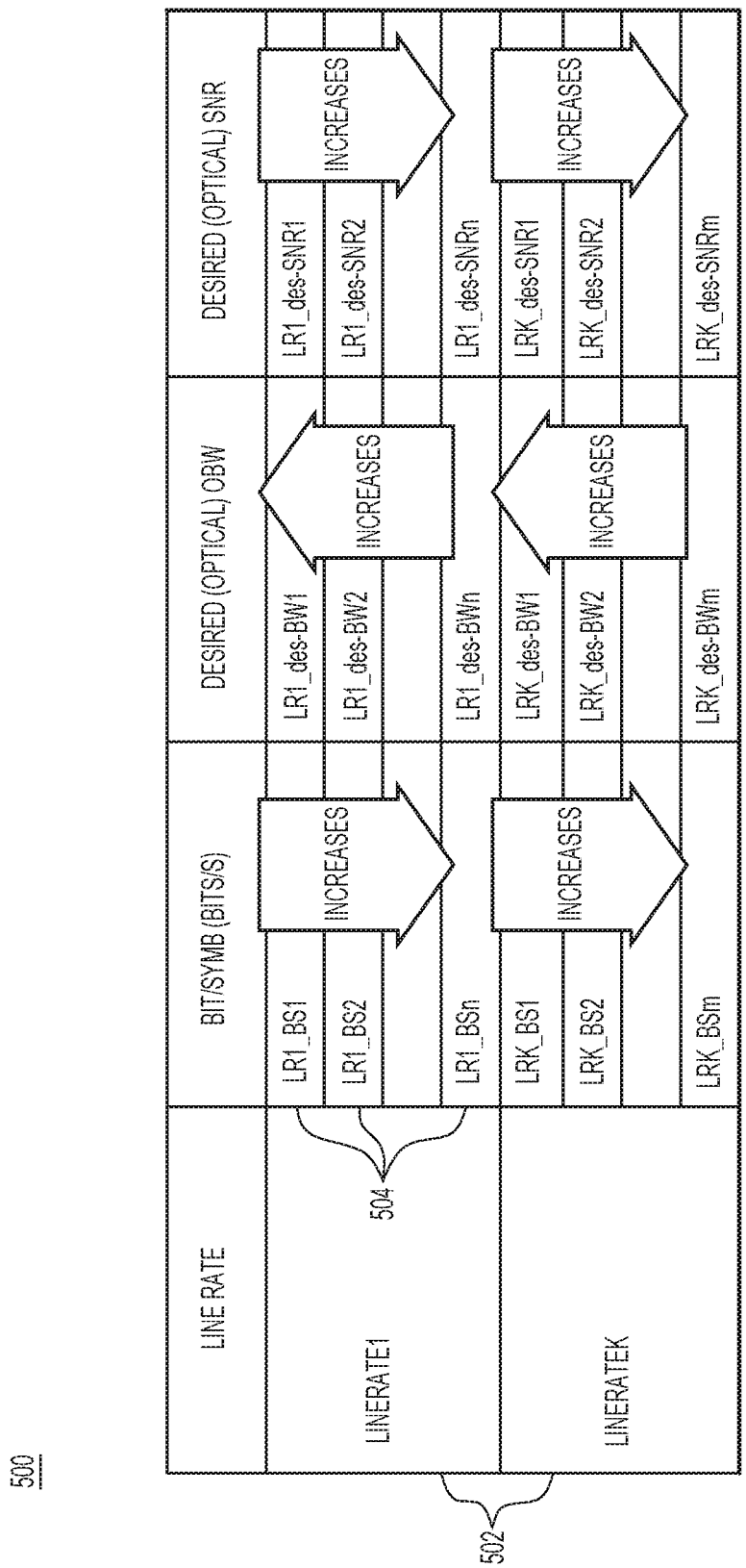
FIG. 5 is an illustration of a line rate database stored in the optical network, according to an example embodiment.

With reference to FIG. 5, there is an illustration of an example line rate database 500 corresponding to line rate database 124. The OBWs and OSNRs referenced in line rate database 500 are in the optical domain.

The example of FIG. 5 assumes the following rules:

a. The flexible optical interfaces of each of optical nodes 102 are each able to transport optical traffic at several different line rates, each generally referred to as a "LineRateK," where LineRate is denoted "LR."

b. Each LineRateK may be transported with different combinations of bits/symbol (BS) (referred to as "LRK_BSn") and desired OBW (LRK-des-BWn). Desired OBW is generally proportional to symbol rate and, in this example, is equal to symbol rate, i.e., LRK-des-BWn=symbol rate.

c. For a given line rate (e.g., LineRateK) the higher the bit/symbol the lower the desired OBW (e.g., symbol rate) and the higher the desired OSNR.

d. Line rate, bits/symbol and desired OBW (e.g., symbol rate) are 3 mutually related line rate parameters; once any 2 line rate parameters are known, the $3^{rd}$ line rate parameter may be determined from the 2 known line rate parameters.

e. When line rate, bit/symbol, and desired OBW (e.g., symbol rate) are known, the desired OSNR may also be determined from the aforementioned parameters.

Following the above rules, line rate database 500 includes line rate (LR) entries 502 (e.g., rows) each for a corresponding one of line rates LineRate1, LineRateK, and so on. The line rates may range from 50 Gigabits/sec (Gbps) up to 600 Gbps, for example, and typical symbol rates may range from 25-70 Gigabaud, for example. For each LineRate, database 500 includes multiple sub-entries 504 (e.g., sub-rows) each specifying a respective tuple of [bits/symbol, symbol rate] to achieve the LineRate, as well as a desired OSNR to accommodate that tuple of [bits/symbol, symbol rate] for satisfactory error performance, e.g., error free transmission. For example, from line rate database 500, LineRate1 may be achieved using any of the following sets of line rate parameters (a)-(c):

a. The line rate tuple of [bits/symbol=LR1_BS1, symbol rate=LR1_des-BW1], with a desired OSNR=LR1_des-SNR1;

b. The line rate tuple of [bits/symbol=LR1_BS2, symbol rate=LR1_des-BW2], with a desired OSNR of LR1_des-SNR2; or c. The line rate tuple of [bits/symbol=LR1_BSn, symbol rate=LR1_des-BWn] with a desired OSNR of LR1_des-SNRn.

At operation 308, network controller 104 accesses the available OBW and the available OSNR for each path from path database 120.

With reference to FIG. 6, there is an illustration of an example path database 600 corresponding to path database 120.

Path database 600 includes entries 602 (e.g., rows) each for a corresponding one of network paths path1-path4 shown in FIG. 4. For each path, database 600 includes a path identifier in a first column 604, an available OBW (OBW_Pi) in a second column 606, a reference available OSNR (OSNRref_Pi) reference to a reference symbol rate in a $3^{rd}$ column 608, and a $3^{rd}$ path metric PMi (e.g., network path length, network path latency/time delay, and so on) in a $4^{th}$ column 610. Typical OBWs vary greatly, and may include OBWs such as 160 GHz, 400 GHz, 500 GHz, and so on.

Available OBW and reference available OSNR parameters OBW_Pi and OSNRref_Pi may be stored in path database 600 at a centralized database or an optical node level (e.g., one storage site for each network section 108) via a distributed database. In case of distributed database, OBW_Pi=Function_of [OBW_Sj] and OSNRref_Pi= Function_of [OSNR_Sj], where OBW_Sj and OSNR_Sj are the available OBW and available OSNR of the different network sections composing the path Pi. OBW_Pi is a generalized representation of a total optical spectrum available on Path-i, and may include fragmented, non-contiguous/continuous available OBW. Generally, a desired OBW for a given tuple is fully/completely accommodated in a contiguous/continuous portion of available OBW. Additional Path parameters, directly related to the fiber/span physical characteristic, such as Chromatic Dispersion or Polarization Mode Dispersion, may also be stored and their impact evaluated when the specific optical channel is selected.

Assuming operation 302 selects LineRate1 as the desired line rate, for each path1-path4, operation 310 searches among tuples (a)-(c) for LineRate1 (e.g., [LR1_BS1, LR1_des-BW1], [LR1_BS2, LR1_des-BW2], and [LR1_BSn, LR1_des-BWn] in line rate database 500 for a tuple that meets the first condition, i.e., a tuple for which the corresponding desired OBW and desired OSNR (also listed in the line rate database) are each less than or equal to the available OBW and available OSNR listed in path database 600, respectively, for the path currently being searched. As mentioned above, the search may be conducted such that the searched tuples meet a second condition imposed on the bits/symbol or the symbol rate, for example, that the search identify the tuple having a lowest bits/symbol or a highest bits/symbol.

Additional algorithms for determining an optimal (or near optimal) network path are now described. The additional algorithms each use features described above in connection with FIGS. 3-6.

Algorithm 1 below, presented as pseudo-code, finds a first (initial) feasible path responsive to a request for a connection from optical node A to optical node Z that is to carry optical traffic at a desired/given line rate, LineRateK (from line rate database 500). Algorithm 1 accesses parameters from databases 500 and 600 as indicated in the algorithm. The bandwidths and SNRs referenced in algorithm are in the optical domain. Also, LRK_des-BWi may be considered equivalent to and interchangeable with symbol rate for a given tuple.

---

Algorithm 1:

---

For given LineRateK,
  For each Path-j form A-Z
    Find lowest LRK_BSi that has LRK_des-BWi that can be allocated
    in a continuous spectrum section ∈ OBW_Pj;
      Re-normalize the OSNRref_Pj with LRK_des-BWi (e.g., symbol
      rate) => SNR_Pj
      If SNR_Pj >= LRK_des-SNRi
        The Path-j is feasible at LineRateK with LRK_BSi
        bit/symbol
      Exit
      Move to next Path-j
  If no Path-j is available to search, connection A-Z is not feasible at
  LineRateK.

---

For each path, Algorithm 1 searches for a tuple that meets the first condition described above, that is, a tuple [bits/symbol=LRK_BSi, symbol rate=LRK_des-BWi] that can be accommodated by the available OBW and available OSNR on the path being searched. Because line rate database 500 stores reference available OSNR (OSNRref_Pj) (from path database 600) referenced to/normalized based on a reference symbol rate, Algorithm 1 re-normalizes or scales the reference available OSNR (OSNRref_Pj) based on the tuple symbol rate (e.g., desired OBW (LRK_des-BWi)). This produces an available SNR (SNR_Pj) of the path that can be compared directly to the corresponding desired OSNR (LRK_des-SNRi) for the tuple. The aforementioned re-normalize and compare operations may be generalized as follows:
  a. Scaling/re-normalizing a reference available OSNR from a reference symbol rate to a symbol rate of a tuple being searched, to produce a scaled available OSNR; and
  b. Comparing the scaled available SNR to the desired SNR for the tuple being searched.

For each path, Algorithm 1 also searches a second condition, that is, to find the tuple having the lowest bits/symbol (LRK_BSi) that can be allocated in the available BW of the path being searched.

As mentioned above with respect to method 300, when Algorithm 1 finds multiple feasible paths, network controller 104 may sort the paths based on path latency or path length, for example, and select from the sorted feasible paths the feasible path with the minimum latency or minimum length (i.e., the shortest path), respectively.

Algorithm 2 below, also presented as pseudo-code, finds a minimum OBW allocation (desired OBW or symbol rate) for a request for a connection from optical node A to optical node Z at LineRateK. Algorithm 2 accesses parameters from databases 500 and 600 as indicated in the algorithm. The bandwidths and SNRs referenced in algorithm are in the optical domain.

---

Algorithm 2

---

Considering all combination of Bits/Symbol (LRK_BS) and BandWidth
(LRK-des-BW) for the LineRateK
  Start from the highest LRK_BSi
    For each Path-j form A-Z
      Re-normalize the OSNRref_Pj with actual desired BW LRK_des-
      BWi => SNR_Pj
      If (SNR_Pj >= LRK_des-SNRi) AND (LRK_des-BWi can be
      allocated in a continuous spectrum section ∈ OBW_Pj)
      Path-j is a candidate to transport LineRateK using LRK_des-BWi
      Move to next Path-j
  Reduce the LRK_BSi and re-explore all paths
  Sort all the found candidate paths and select the lowest LRK_des-BWi
  (and as an additional criterion, the highest [SNR_Pj - LRK_des-SNRi]
  margin)

---

Algorithm 2 searches each path for tuples based on the first condition, as described above. Also, as a second condition, Algorithm 2 starts with the highest LineRate, and reduces the LineRate if any feasible path is found, and thereby provides a highest channel capacity at a minimum BW for all the paths between optical nodes A and Z.

Additionally, further techniques include exploring the paths between optical nodes A-Z at LineRateK, to find the path "more robust" with the highest OSNR margin, i.e. the path that maximize the metric {SNR_Pj-LRK_des-SNRi}.

Figure 7:
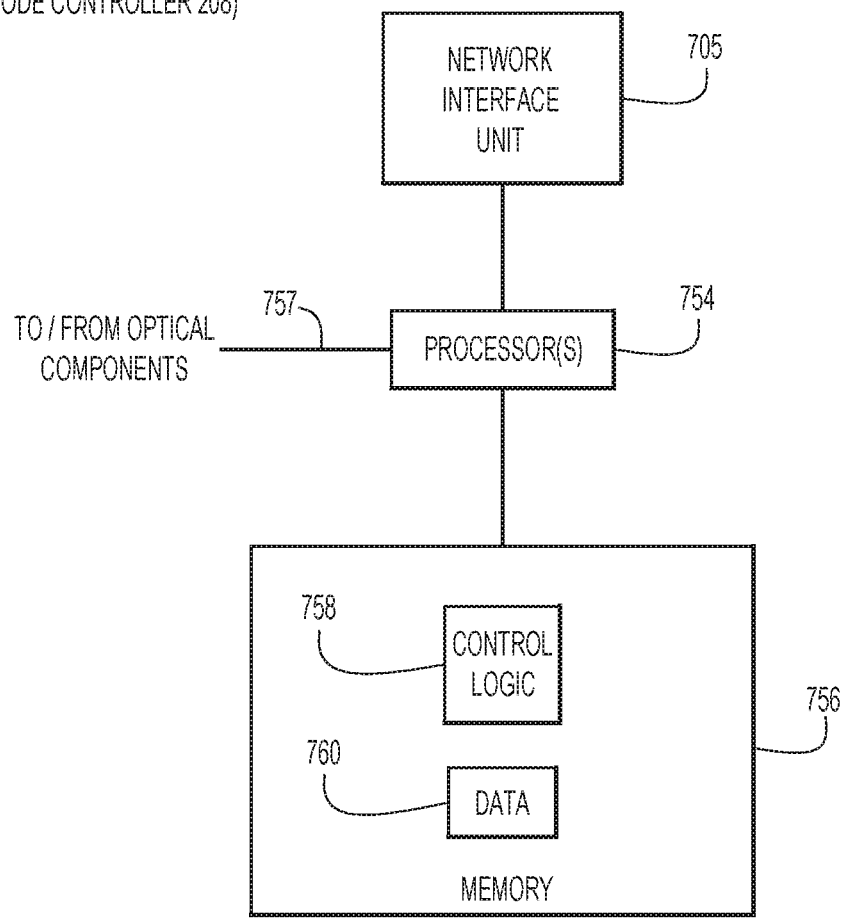
FIG. 7 is a hardware block diagram of a computer device representative of an optical network controller and an optical node controller, according to an example embodiment.

FIG. 7 is a hardware block diagram of an example computer/controller device 700 representative of optical network controller 104 and optical node controller 208. Computer device 700 includes network interface unit 705 to communicate with a communication network. Computer device 700 also includes a processor 754 (or multiple processors, which may be implemented as software or hardware processors), and memory 756. Network interface unit 705 may include an Ethernet card with a port (or multiple such devices) to communicate over wired Ethernet links and/or a wireless communication card with a wireless transceiver to communicate over wireless links. When computer device 700 represents optical node controller 208, processor 754 may control optical components of the optical node, including switching complexes 202 and their optical interfaces, add/drop module 206, and flexible optical interfaces 207 over a control interface 757 coupled between the processor and the optical components.

Memory 756 stores instructions for implementing methods described herein. Memory 756 may include read only memory (ROM), random access memory (RAM), magnetic disk storage media devices, optical storage media devices, flash memory devices, electrical, optical, or other physical/tangible (non-transitory) memory storage devices. The processor 754 is, for example, a microprocessor or a microcontroller that executes instructions stored in memory. Thus, in general, the memory 756 may comprise one or more tangible computer readable storage media (e.g., a memory device) encoded with software comprising computer executable instructions and when the software is executed (by the processor 754) it is operable to perform the operations described herein. For example, memory 756 stores control logic 758 to perform operations described herein. For example, when computer device 700 represents optical network controller 104, control logic 758 includes control logic to perform operations of the optical network controller as described herein, and when computer device 700 represents optical node controller 208, control logic 758 includes control logic to perform operations of the optical node controller as described herein.

The memory 756 may also store data 760 used and generated by logic 758. Data 760 may also include portions of path database 120 and line rate database 124, for example.

In summary, embodiments presented herein combine network knowledge of the optical network control plane with the transmission flexibility of the optical interface of the optical nodes with respect to modulation format and symbol rate in order to provide full optimization of optical traffic transported in an optical network, e.g., to optimize transmission parameters of the optical interface and thus maximize the traffic transported in the optical network according to a given metric. The method proposed in this patent combines the knowledge embedded into the network control plane with the transmission flexibility available in the last generation coherent optical interfaces to optimize the interface transmission parameters and therefore maximize the traffic transported in the specific network according with a given metric. For a given traffic request between a pair nodes in the optical network, the network control plane searches all possible network paths (or a given K subset) and, for each of them, the actual available OSNR and the actual available OBW. The network control plane eliminates those with [OBW, OSNR] below the minimum desired by the flexible optical interface. The available OSNR may be scaled with respect to a reference OSNR according to a specific optical interface symbol rate under consideration. The network paths remaining after the elimination are all able to transport the given traffic demand from the pair of nodes and the most suitable network path can be found by applying different metrics according customer or network operator needs. Some examples are: low OBW occupation; high OSNR margin; shortest path; just enough margin, and so on.

The embodiments may be used to maximize the traffic transported between the pair of nodes on a given network by a single optical interface, by choosing the network path that allows a feasible connection at the highest symbol rate and highest bits/symbol.

In summary, in one form, a method is provided comprising: at a network controller of a network of optical nodes configured to communicate with each other at multiple line rates using different tuples of [bits/symbol, symbol rate] for each line rate: determining multiple paths between two optical nodes; selecting a desired line rate at which to communicate between the two optical nodes; accessing a path database that indicates an available optical bandwidth and an available optical signal-to-noise ratio (SNR) along each path; determining feasible paths among the multiple paths, the determining including, for each path, searching the different tuples of the desired line rate for a tuple for which a desired optical bandwidth and a desired optical SNR are accommodated by the available optical bandwidth and the available optical SNR of the path, respectively; and programming optical nodes of one of the feasible paths with a tuple found in the searching.

In another form, an apparatus is provided comprising: a network interface unit to communicate with a network of optical nodes configured to communicate with each other at multiple line rates using different tuples of [bits/symbol, symbol rate] for each line rate; and a processor coupled to the network interface unit and configured to perform: determining multiple paths between two optical nodes; selecting a desired line rate at which to communicate between the two optical nodes; accessing a path database that indicates an available optical bandwidth and an available optical signal-to-noise ratio (SNR) along each path; determining feasible paths among the multiple paths, the determining including, for each path, searching the different tuples of the desired line rate for a tuple for which a desired optical bandwidth and a desired optical SNR are accommodated by the available optical bandwidth and the available optical SNR of the path, respectively; and programming optical nodes of one of the feasible paths with a tuple found in the searching.

In yet another form, a non-transitory computer readable medium is provided. The computer readable medium is encoded with instruction that, when executed by a processor of a controller of a network of optical nodes configured to communicate with each other at multiple line rates using different tuples of [bits/symbol, symbol rate] for each line rate, cause the processor to perform: determining multiple paths between two optical nodes; selecting a desired line rate at which to communicate between the two optical nodes; accessing a path database that indicates an available optical bandwidth and an available optical signal-to-noise ratio (SNR) along each path; determining feasible paths among the multiple paths, the determining including, for each path, searching the different tuples of the desired line rate for a tuple for which a desired optical bandwidth and a desired optical SNR are accommodated by the available optical bandwidth and the available optical SNR of the path, respectively; and programming optical nodes of one of the feasible paths with a tuple found in the searching.

The above description is intended by way of example only. Various modifications and structural changes may be made therein without departing from the scope of the concepts described herein and within the scope and range of equivalents of the claims.

What is claimed is:

1. A method comprising:
at a network controller of a network of optical nodes configured to communicate at multiple line rates using different tuples of [bits/symbol, symbol rate] for each line rate:
determining multiple paths between two optical nodes;
selecting a desired line rate for the two optical nodes;
accessing a path database that indicates available optical bandwidth and available optical signal-to-noise ratio (SNR) referenced to a reference symbol rate along each of the multiple paths;
determining one or more feasible paths among the multiple paths by, for each of the multiple paths, searching the different tuples of the desired line rate for a tuple for which a desired optical bandwidth and a desired optical SNR are accommodated by the available optical bandwidth and the available optical SNR of the path, respectively, wherein the searching includes:
scaling the available optical SNR from the reference symbol rate to the symbol rate of the tuple being searched to produce a scaled optical SNR; and
comparing the scaled optical SNR to the desired optical SNR for the tuple being searched; and
programming optical nodes of one of the feasible paths with a tuple found by the searching.

2. The method of claim 1, wherein the searching includes searching the different tuples of the desired line rate for a tuple that meets one or more additional conditions imposed on the bits/symbol or the symbol rate.

3. The method of claim 2, wherein the searching includes searching for a tuple that has a lowest bits/symbol and corresponding desired optical SNR among the different tuples and that has a desired optical bandwidth that is able to be allocated in a continuous spectrum of the available optical bandwidth of the path being searched.

4. The method of claim 2, wherein the searching includes searching for a tuple that has a highest bits/symbol and correspondingly lowest desired optical bandwidth among the different tuples and that has a desired optical bandwidth that is able to be allocated in a continuous spectrum of the available optical bandwidth of the path being searched.

5. The method of claim 1, wherein the method further comprises, when the determining one or more feasible paths determines multiple feasible paths:
for each feasible path of the multiple feasible paths, computing an optical SNR margin as a difference between the available optical SNR for the feasible path and the desired optical SNR for the tuple found for the feasible path; and
selecting a feasible path of the multiple feasible paths having a largest optical SNR margin.

6. The method of claim 1, wherein the path database further indicates a respective time latency for each path, and the method further comprises, when the determining one or more feasible paths determines multiple feasible paths, selecting as the one of the feasible paths a feasible path having a minimum latency among the multiple feasible paths.

7. The method of claim 1, wherein the bits/symbol of the different tuples increase across the different tuples, while the symbol rates of the different tuples correspondingly decrease across the different tuples.

8. An apparatus comprising:
a network interface unit to communicate with a network of optical nodes configured to communicate with each other at multiple line rates using different tuples of [bits/symbol, symbol rate] for each line rate; and
a processor coupled to the network interface unit and configured to perform operations including:
determining multiple paths between two optical nodes;
selecting a desired line rate for the two optical nodes;
accessing a path database that indicates available optical bandwidth and available optical signal-to-noise ratio (SNR) referenced to a reference symbol rate along each of the multiple paths;
determining one or more feasible paths among the multiple by, for each of the multiple paths, searching the different tuples of the desired line rate for a tuple for which a desired optical bandwidth and a desired optical SNR are accommodated by the available optical bandwidth and the available optical SNR of the path, respectively, wherein the searching includes:
scaling the available optical SNR from the reference symbol rate to the symbol rate of the tuple being searched to produce a scaled optical SNR; and
comparing the scaled optical SNR to the desired optical SNR for the tuple being searched; and
programming optical nodes of one of the feasible paths with a tuple found by the searching.

9. The apparatus of claim 8, wherein the processor is configured to perform the searching by searching the different tuples of the desired line rate for a tuple that meets one or more additional conditions imposed on the bits/symbol or the symbol rate.

10. The apparatus of claim 9, wherein the processor is configured to perform the searching by searching for a tuple that has a lowest bits/symbol and corresponding desired optical SNR among the different tuples and that has a desired optical bandwidth that is able to be allocated in a continuous spectrum of the available optical bandwidth of the path being searched.

11. The apparatus of claim 9, wherein the processor is configured to perform the searching by searching for a tuple that has a highest bits/symbol and correspondingly lowest desired optical bandwidth among the different tuples and that has a desired optical bandwidth that is able to be allocated in a continuous spectrum of the available optical bandwidth of the path being searched.

12. The apparatus of claim 8, wherein the apparatus is further configured to perform, when the determining one or more feasible paths determines multiple feasible paths:
for each of the multiple feasible paths, computing an optical SNR margin as a difference between the available optical SNR for the feasible path and the desired optical SNR for the tuple found for the feasible path; and
selecting a feasible path of the multiple feasible paths having a largest optical SNR margin.

13. The apparatus of claim 8, wherein the path database further indicates a respective time latency for each path; and
the processor is further configured to perform, when the determining one or more feasible paths determines multiple feasible paths, selecting as the one of the multiple feasible paths the feasible path having a minimum latency among the feasible paths.

14. The apparatus of claim 8, wherein the bits/symbol of the different tuples increase across the different tuples, while the symbol rates of the different tuples correspondingly decrease across the different tuples.

15. A method comprising:
at a network controller of a network of optical nodes configured to communicate at multiple line rates using different tuples of [bits/symbol, symbol rate] for each line rate, wherein the bits/symbol of the different tuples increase across the different tuples, while the symbol rates of the different tuples correspondingly decrease across the different tuples:
determining multiple paths between two optical nodes;
selecting a desired line rate for the two optical nodes;
accessing a path database that indicates an available optical bandwidth and an available optical signal-to-noise ratio (SNR) along each path;
determining one or more feasible paths among the multiple paths by, for each path, searching the different tuples of the desired line rate for a tuple for which a desired optical bandwidth and a desired optical SNR are accommodated by the available optical bandwidth and the available optical SNR of the path, respectively;
when the determining one or more feasible paths determines multiple feasible paths, selecting a feasible path from the multiple feasible paths based on a predetermined criterion; and
programming optical nodes of a selected feasible path with a tuple found by the searching.

16. The method of claim 15, wherein the selecting the feasible path includes:
for each of the multiple feasible paths, computing an optical SNR margin as a difference between the available optical SNR for the feasible path and the desired optical SNR for the tuple found by the searching the different tuples for each of the multiple feasible paths; and
selecting a feasible path of the multiple feasible paths having a largest optical SNR margin.

17. The method of claim 15, wherein the path database further indicates a respective time latency for each path, and the selecting includes selecting the feasible paths of the multiple feasible paths having a minimum latency among the feasible paths.

18. The method of claim 15, wherein the searching includes searching for a tuple that has a lowest bits/symbol and corresponding desired optical SNR among the different tuples and that has a desired optical bandwidth that is able to be allocated in a continuous spectrum of the available optical bandwidth of the path being searched.

19. The method of claim 15, wherein the searching includes searching for a tuple that has a highest bits/symbol and correspondingly lowest desired optical bandwidth among the different tuples and that has a desired optical bandwidth that is able to be allocated in a continuous spectrum of the available optical bandwidth of the path being searched.

20. The method of claim 15, wherein the network of optical nodes includes a spectrum switched optical network (SSON) and the optical nodes each includes a reconfigurable optical add-drop multiplexer (ROADM).

\* \* \* \* \*